United States Patent Office 3,560,923
Patented Feb. 2, 1971

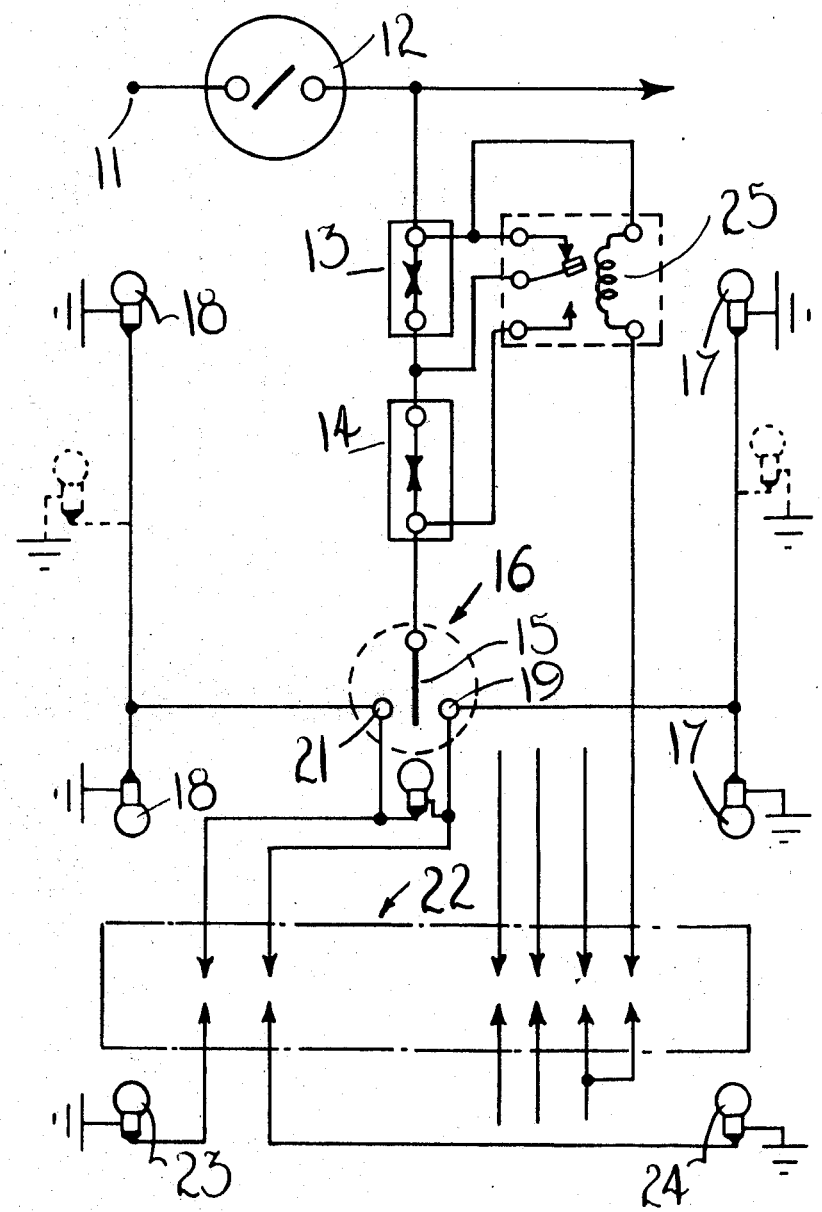

---

3,560,923
DIRECTION INDICATOR SYSTEMS FOR TRACTOR-TRAILER VEHICLES
Eric Bernard Parkes, Selly Oak, Birmingham, England, assignor to Joseph Lucas (Industries) Limited, Birmingham, England
Filed June 25, 1969, Ser. No. 836,447
Claims priority, application Great Britain, July 25, 1968, 35,482/68
Int. Cl. B60q 1/38
U.S. Cl. 340—81
3 Claims

ABSTRACT OF THE DISCLOSURE

A direction indicator system for a tractor-trailer vehicle has a direction indicator switch on the tractor through which the lamps on the tractor can be energised and a supply terminal on the tractor. First and second flasher units are connected in series between the supply terminal and the movable contact of the direction indicator switch, and an electrical connector on the tractor is provided for engagement with a complementary connector on a trailer, these connectors when engaged connecting the flasher lamps at opposite sides of the trailer in parallel with the flasher lamps at opposite sides of the tractor respectively. A two position switch is used which in one position short-circuits the first flasher unit and in its other position short-circuits the second flasher unit, so that the correct flasher unit is always used depending on whether the trailer vehicle is in operation, or not.

---

This invention relates to a direction indicator system for a tractor vehicle which can be used with or without a trailer.

A system according to the invention comprises a direction indicator switch on the tractor through which the direction indicator lamps on the tractor can be energised, a supply terminal on the tractor, first and second flasher units connected in series between the supply terminal and the movable contact of the direction indicator switch, an electrical connector on the tractor for engagement with a complementary connection on a trailer, the connectors serving when engaged to connect the flasher lamps at opposite sides of the trailer in parallel with the flasher lamps at opposite sides of the tractor respectively, and a two position switch which in one position short-circuits the first flasher unit and in its other position short-circuits the second flasher unit, the flasher units being chosen respectively to give the desired frequency of operation of the flasher lamps with the complementary connectors engaged and disengaged.

The accompanying drawing is a circuit diagram illustrating one example of the invention.

Referring to the drawing, there is provided on the tractor a terminal 11 which is connected to the vehicle battery the other side of the vehicle battery being earthed. The terminal 11 is connected through an ignition switch 12 and a pair of flasher units 13, 14 in series to the movable contact 15 of a direction indicator switch 16, the switch 16 being operable to move the contact 15 into engagement with a contact 19 for energising the direction indicator or lamps 17 at one side of the tractor, or into engagement with a contact 21 for energising the direction indicator lamps 18 at the other side of the vehicle. The contacts 21 and 19 are connected to terminals on one part of a plug and socket connector, the other part of which is positioned on the trailer. When the tractor and trailer are engaged, the plug and socket connector is completed to make circuits to the flasher lamps 23 and 24 on the trailer, the lamps 23 being in parallel with the lamps 18 and the lamp 24 being in parallel with the lamps 17.

On the tractor is a changeover relay 25 one side of the coil of which is connected to the terminal 11 through the switch 12, and the other side of which is connected to a terminal on the plug and socket connector. The arrangement is such that when the plug and socket connector is not made, the relay coil 25 is deenergised and the contacts of the relay short-circuit the unit 13, so that the flashing rate is determined solely by the unit 14. However, when the plug and socket connector is made, the earth connection to the relay coil 25 is completed, so that the relay is energised, where upon its armature moves to the alternative position in which it short circuits the unit 14, so that the flashing rate is determined solely by the unit 13. The units 13 and 14 which are preferably of the kind employing a snapping vane, are chosen so that when the unit 14 is in use with the trailer disengaged, substantially the same flashing rate is obtained as when the unit 13 is in use with the trailer engaged.

In a modification, the relay is controlled by a manually operable switch on the tractor. With this arrangement, if the switch is in the incorrect position, the flashing rate will vary substantially from the correct rate, so giving a warning to the driver. In another modification, no relay is used and the switch which effects the short-circuiting is manually operable.

Having thus described my invention what I claim as new and desire to secure by Letters Patent is:

1. A direction indicator system for a tractor vehicle which can be used with or without a trailer, comprising a direction indicator switch on the tractor through which the direction indicator lamps on the tractor can be energised, a supply terminal on the tractor, first and second flasher units connected in series between the supply terminal and the movable contact of the direction indicator switch, an electrical connector on the tractor for engagement with a complementary connector on a trailer, the connectors serving when engaged to connect the flasher lamps at opposite sides of the trailer in parallel with the flasher lamps at opposite sides of the tractor respectively, and a two position switch which in one position short-circiuts the first flasher unit and in its other position short-circuits the second flasher unit, the flasher units being chosen respectively to give the desired frequency of operation of the flasher lamps with the complementary connectors engaged and disengaged.

2. A system as claimed in claim 1 in which the two position switch is the contact of a relay which can be energised or deenergised to determine which flasher unit is operative.

3. A system as claimed in claim 2 in which the relay is controlled automatically by the complementary connectors to ensure that the correct flasher unit is always operative.

References Cited

FOREIGN PATENTS 1,101,962   8/1963   Great Britain _____ 340—81

DONALD J. YUSKO, Primary Examiner

K. N. LEIMER, Assistant Examiner

U.S. Cl. X.R.

340—73